United States Patent
Kandhadi et al.

(10) Patent No.: US 12,099,476 B2
(45) Date of Patent: Sep. 24, 2024

(54) DISTRIBUTED SMART LOCK SYSTEM

(71) Applicant: Dell Products L.P., Round Rock, TX (US)

(72) Inventors: Gopi Kandhadi, Austin, TX (US); Maleravalappil Mohammad Sadiq, Round Rock, TX (US); Irfan Gilani, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 17/508,201

(22) Filed: Oct. 22, 2021

(65) Prior Publication Data

US 2023/0128133 A1    Apr. 27, 2023

(51) Int. Cl.
*G06F 16/176* (2019.01)
*G06F 11/07* (2006.01)
*G06F 16/17* (2019.01)

(52) U.S. Cl.
CPC ...... *G06F 16/1774* (2019.01); *G06F 11/0757* (2013.01); *G06F 16/1734* (2019.01)

(58) Field of Classification Search
CPC ............... G06F 16/176–1774; G06F 16/1734
See application file for complete search history.

(56) References Cited

U.S. PATENT DOCUMENTS

| | | | | |
|---|---|---|---|---|
| 8,700,563 | B1* | 4/2014 | Thomson | G06F 16/2336 709/201 |
| 2005/0066095 | A1* | 3/2005 | Mullick | G06F 16/1774 710/200 |
| 2006/0265704 | A1* | 11/2006 | Holt | G06F 15/16 717/169 |
| 2013/0318058 | A1* | 11/2013 | Fries | G06F 16/2365 707/703 |
| 2014/0068127 | A1* | 3/2014 | Baron | G06F 9/526 710/200 |
| 2017/0308547 | A1* | 10/2017 | Gupta | G06F 16/178 |
| 2017/0316026 | A1* | 11/2017 | Kanthak | G06F 16/182 |
| 2021/0028936 | A1* | 1/2021 | Shaw | G06F 16/182 |

* cited by examiner

*Primary Examiner* — Van H Oberly
(74) *Attorney, Agent, or Firm* — Daly, Crowley, Mofford & Durkee, LLP

(57) ABSTRACT

A method, comprising: receiving a request to acquire a lock that is associated with a resource; transitioning the lock into an acquired state in response to the request; and releasing the lock.

17 Claims, 13 Drawing Sheets

DISTRIBUTED SMART LOCK SYSTEM

BACKGROUND

Common schemes for accessing shared resources involve the use locks. A process could acquire a lock before using a resource associated with the lock. The process may retain possession of the lock while modifying the resource, after which the process may release the lock. While the process is in possession of the lock, no other processes may be allowed to modify the resource associated with the lock.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving a request to acquire a lock that is associated with a resource; transitioning the lock into an acquired state in response to the request; and releasing the lock.

According to aspects of the disclosure, a system is provided, comprising: at least one processor that is configured to perform the operations of: receiving a request to acquire a lock that is associated with a resource; transitioning the lock into an acquired state in response to the request; and releasing the lock.

According to aspects of the disclosure, a non-transitory computer-readable medium is provided that stores one or more processor-executable instructions, which when executed by at least one processor cause the at least one processor to perform the operations of: receiving a request to acquire a lock that is associated with a resource; transitioning the lock into an acquired state in response to the request; and releasing the lock.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
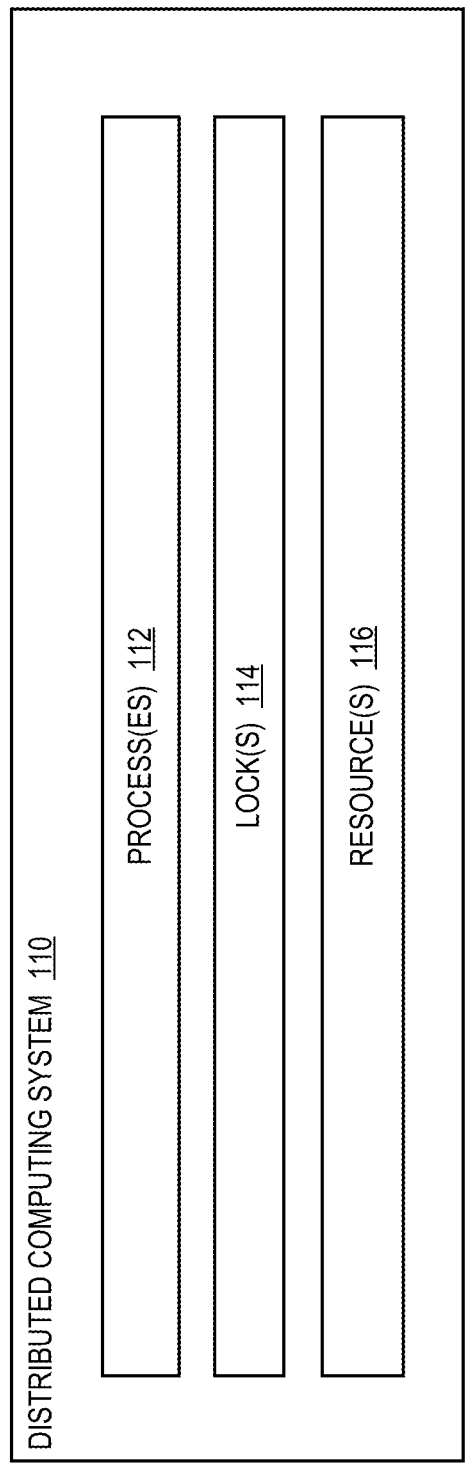
FIG. 1 is a diagram of an example of a system, according to aspects of the disclosure.

FIG. 1 is a diagram of a distributed computing system 110. The distributed computing system 110 may include a plurality of computing devices, such as the computing device 600, which is discussed further below with respect to FIG. 6. According to the present example, the computing system 110 implements the Microsoft Orleans TM framework. However, it will be understood that the present disclosure is not limited to any specific implementation of the distributed computing system 110. The techniques and processes presented in this disclosure can be applied to any distributed computing system.

The distributed computing system 110 may be configured to execute one or more processes 112, one or more locks 114, and one or more resources 116. Each of the resources 116 may include one or more data items. For example, any of the resources 116 may include a single file or a single object that is stored in the memory of the computing system 110. Additionally or alternatively, any of the resources may be an in-process resource or an out-of-process resource. As another example, any of the resources may include a collection of files or a collection of other objects. Each of the processes 112 may include software that is configured to access and/or modify the resources. Each of the locks 114 may be configured to control access to one of the resources 116. According to the present example, the system 110 is configured such that none of the resources 116 may be modified by one of the processes 112 unless the application is in possession of a respective one of the locks 114 that is associated with the resource. When a process 112 wants to modify one of the resources, the process 112 must first acquire a lock associated with the resource. After the process has modified the resource, the process may release the lock. As used throughout the disclosure, the term "process" may refer to any sequence of processor executable instructions whose execution is scheduled by a scheduler, such as an operating system scheduler or an application scheduler, etc. Examples of processes include an operating system process, an application thread, and/or any other suitable type of sequence of processor-executable instructions.

Each of the locks 114 may be used to control read-access or write-access of any of the resources 116—that is, any of the locks may be used to synchronize the retrieval of a resource from memory or the modification of the resource. As used throughout the disclosure, the term lock shall refer to any suitable type of synchronization object or variable. In instances in which the Microsoft Orleans TM framework is used, each of the locks may be a grain. The discussion that follows provides examples of different implementations for the locks 114.

Figure 2A:
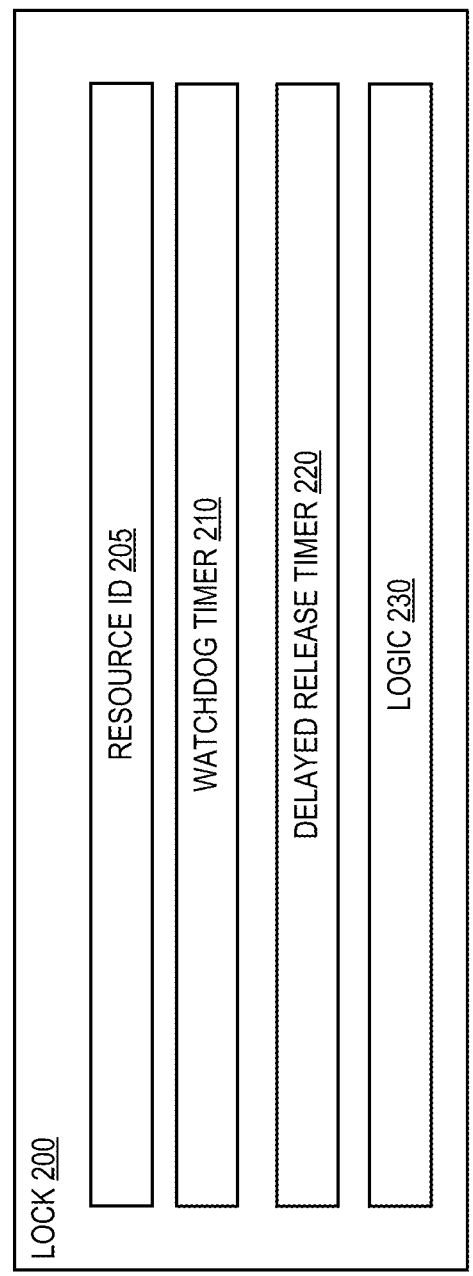
FIG. 2A is a diagram of an example of a lock, according to aspects of the disclosure.
Figure 2B:
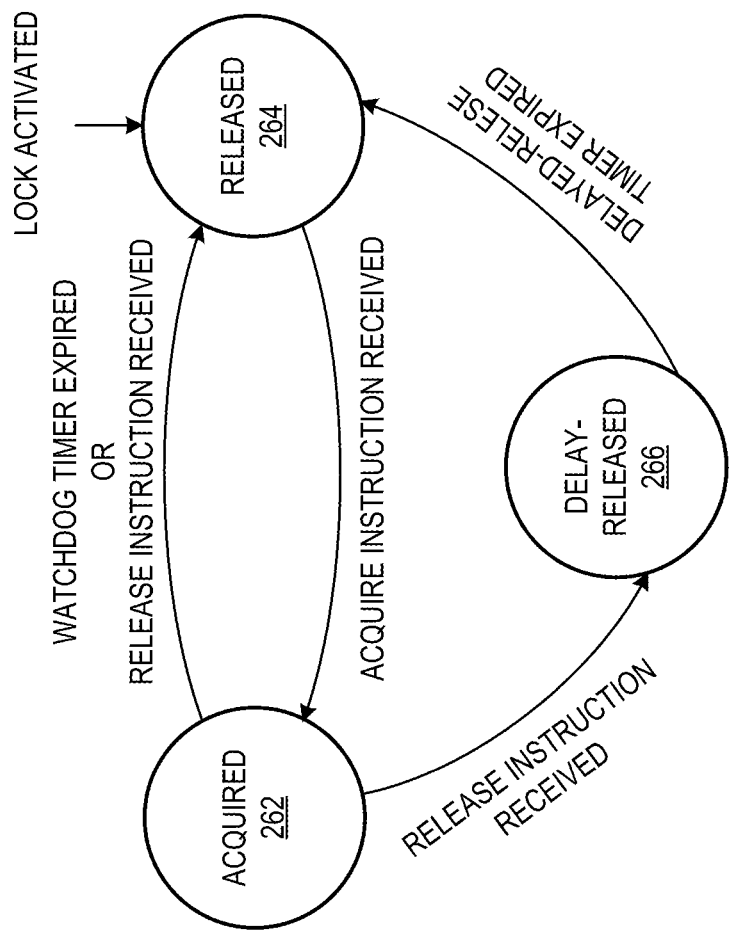
FIG. 2B is a state diagram illustrating the operation of FIG. 2A, according to aspects of the disclosure.

FIG. 2A is a diagram of an example of a lock 200, according to aspects of the disclosure. The lock 200 may be the same or similar to any of the locks 114, which are discussed above with respect to FIG. 1. The lock 200 may include a resource ID 205, which identifies a resource that is associated with the lock. The lock 200 may include a watchdog timer 210 (hereinafter "timer 210"), a delayed-release timer 220 (hereinafter "timer 220"), and logic 230. FIG. 2B is a state diagram illustrating aspects of the operation of the lock 200. As illustrated, the lock 200 may be in one of a released state 264, an acquired state 262, and a delay-released state 262. When the lock 200 is in a released state, the logic may be available for acquisition by processes that are running on the system 110. When the lock 200 is in an acquired state, the lock may be in possession of one of the processes that are running on the system 110. When the lock 200 is in a delay-released state, the lock may have been released by the process, which was holding it previously, but the lock may be unavailable for acquisition by another one of the processes 112 until the timer 220 has expired. When the lock 200 is first activated, the lock 200 may enter the released state 264, after which the state of the lock 200 may be managed by the logic 230, as discussed below.

In operation, the logic 230 may receive an acquire instruction from a given one of the processes 112. In response to the acquire instruction, the logic 230 may determine if the lock 200 is in the released state 264. If the lock 200 is not in the released state 264, the logic 230 may return an error. If the lock is in the released state 264, the logic 230 may transition the lock 200 into the acquired state 262 and transmit an acknowledgment, to the given process 112, indicating that the given process 112 is now in possession of the lock 200.

While the given process 112 is in possession of the lock, the given process may modify or read a resource associated with the lock 200. After the given process 112 has finished manipulating the resource, the given process 112 may issue a release instruction to the lock 200. In response to receiving the release instruction, the logic 230 may determine if the timer 220 is set. If the timer 220 has been set, the logic 230 may transition the lock 200 from the acquired state 262 to the delay-released state 266, and cause the timer to begin decrementing. If the timer 220 is not set, the logic 230 may transition the lock 200 from the acquired state 262 to the released state 264.

While the lock 200 is in the delay-released state 266, the logic 230 may monitor the state of the timer 220. Specifically, the logic 230 may periodically check if the timer 220 has expired or listen for an event indicating that the timer 220 has expired. In response to detecting that the timer 220 has expired, the logic 230 may transition the lock 200 from the delay-released state 266 to the released state 264.

Additionally or alternatively, the lock 200 may have a passive configuration. In such implementations, the logic 230 may not automatically monitor the delayed release timer 220. Rather, the logic 230 may only check if the delayed release timer 220 has expired upon the receipt of an acquire instruction. In such implementations, when an acquire instruction is received the lock may transition into the acquired state 262 directly from the delayed-released state 266.

While the lock 200 is in the acquired state, the lock 200 may monitor the state of timer 210 (provided that timer 210 has been set). Specifically, the logic 230 may periodically check if the timer 210 has expired or listen for an event indicating that the timer 210 has expired. If the timer 210 has expired, the logic 230 may transition the lock 200 from the acquired state 262 to the released state 264 (or delay-released state 266). For example, in response to detecting that the timer 210 has expired, the logic 230 may determine if the timer 220 is set. If the timer 220 is set, the logic 230 may transition the lock 200 from the acquired state 262 to the delay-released state 266. If the timer 220 is not set, the logic 230 may transition the lock 200 from the acquired state 262 to the released state 264. The given process 112 may be configured to periodically reset the timer 210 to prevent it from expiring. In other words, the timer 210 may expire when the given process 112 has crashed or another abnormal event has taken place which has caused the given process 112 to become unresponsive.

As noted above, the system 110 is a distributed computing system including multiple processors (with separate memory spaces) and/or multiple computing devices (having their own memory spaces). Accordingly, multiple copies of a resource may be maintained in different memory spaces to increase efficiency. When one of the copies is modified, the state of the other copies may be synchronized with the modified copy to maintain the resource in a consistent state. In this regard, it can be readily appreciated that transitioning the lock into a delay-released state before the lock is fully released may allow enough time for different copies of the resource to be synchronized, and thus prevent a race condition in which a process attempts to modify a copy of the resource before that copy is synchronized with an already-modified copy. Additionally or alternatively, in the context of storage systems, transitioning the lock into a delay-release state may afford enough time to complete data de-duplication operations on the resource and/or data replication operations on the resource before the resource can be modified again.

FIGS. 2A-B are provided as an example only. It will be understood that in some implementations, at least some functionalities of the lock 200 may be omitted. For example, in some implementations the delay-release feature or the watchdog timer may be omitted. In this regard, it will be understood that the present disclosure is not limited to any specific implementation of the lock 200.

Figure 3A:
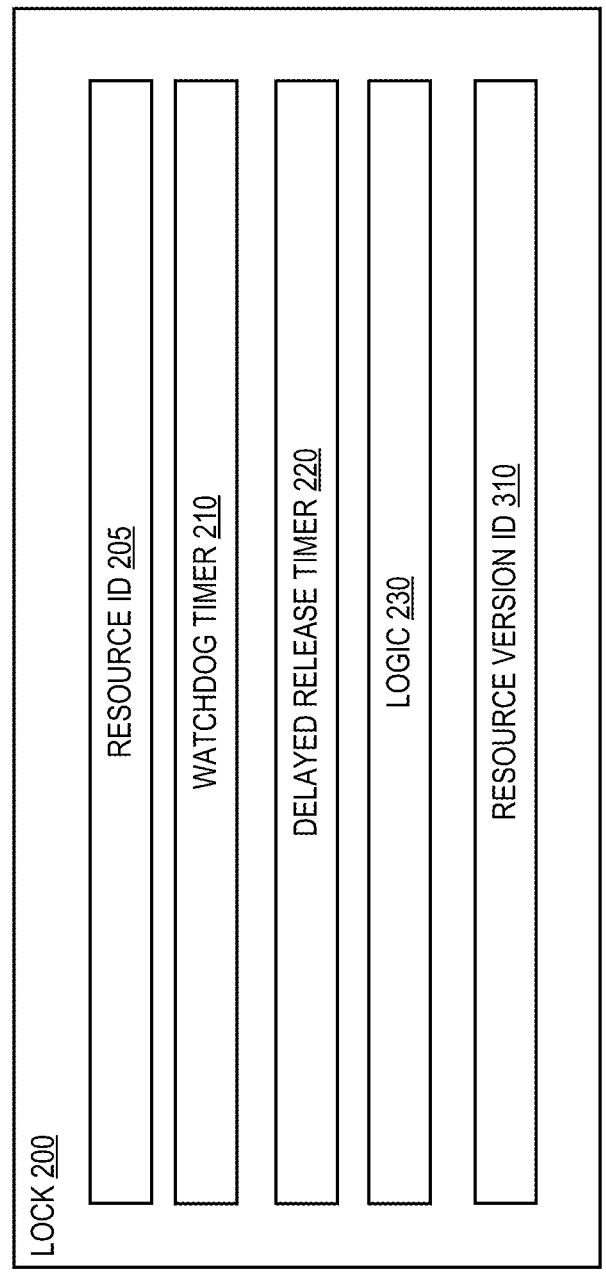
FIG. 3A is a diagram of an example of a lock, according to aspects of the disclosure.
Figure 3B:
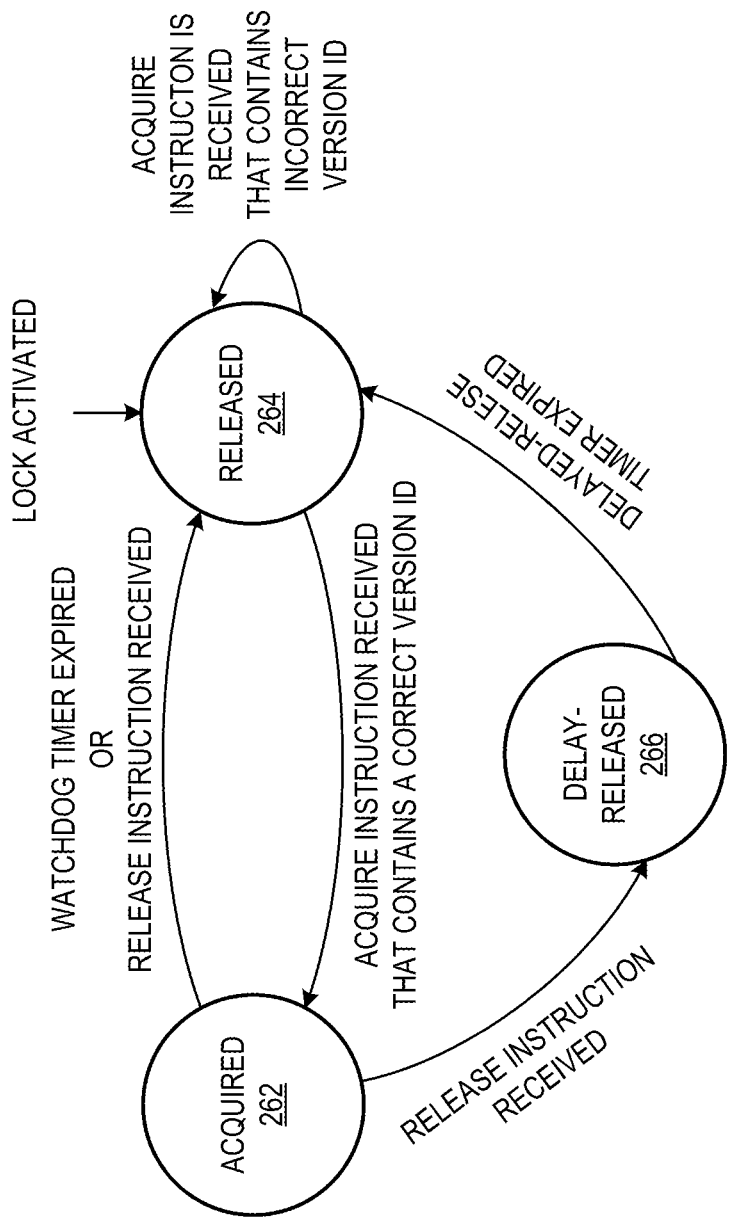
FIG. 3B is a state diagram illustrating the operation of FIG. 3A, according to aspects of the disclosure.

FIG. 3A is a diagram of the lock 200, in accordance with another implementation. In the example of FIG. 3A, the lock 200 includes a resource version ID 310. The resource version ID 310 may identify the most recent version of the resource associated with the lock 200. FIG. 3B is a state diagram illustrating aspects of the operation of the lock 200. FIG. 3B is nearly identical to FIG. 2B. However, unlike FIG. 2B, FIG. 3B illustrates that any acquire instruction that is received by the logic 230 from the given process 112 must include a resource version identifier. As illustrated in FIG. 3B, upon receiving an acquire instruction from a given process 112 while the lock 200 is in the released state 264, the logic 230 may determine if the acquire instruction contains a resource version identifier that matches the resource version ID. If the resource identifier that is contained in the acquire instruction matches the resource version identifier 310, the logic 230 may transition the lock 200 from the released state 264 to the acquired state 262 and transmit an acknowledgment, to the given process 112, indicating that the given process 112 is now in possession of the lock 200. Otherwise, if the version identifier contained in the acquire instruction does not match the resource version identifier 310, the logic 230 may return an error. Moreover, when the resource associated with the lock 200 is released (or delay-released), after being modified, the resource version ID 310 may be incremented either by the logic 230 or the process that was last in possession of the lock 200, and which performed the modification.

As noted above, the system 110 is a distributed computing system including multiple processors (with separate memory spaces) and/or multiple computing devices (having their own memory spaces). Accordingly, multiple copies of a resource may be maintained in different memory spaces to increase efficiency. When one of the copies is modified, the state of the other copies may be synchronized with the modified copy to maintain the resource in a consistent state. In this regard, it can be readily appreciated that maintaining a resource version ID at the lock 200 is advantageous because it could prevent a race condition in which a process attempts to modify a copy of the resource before that copy is synchronized with an earlier-modified copy.

Figure 4A:
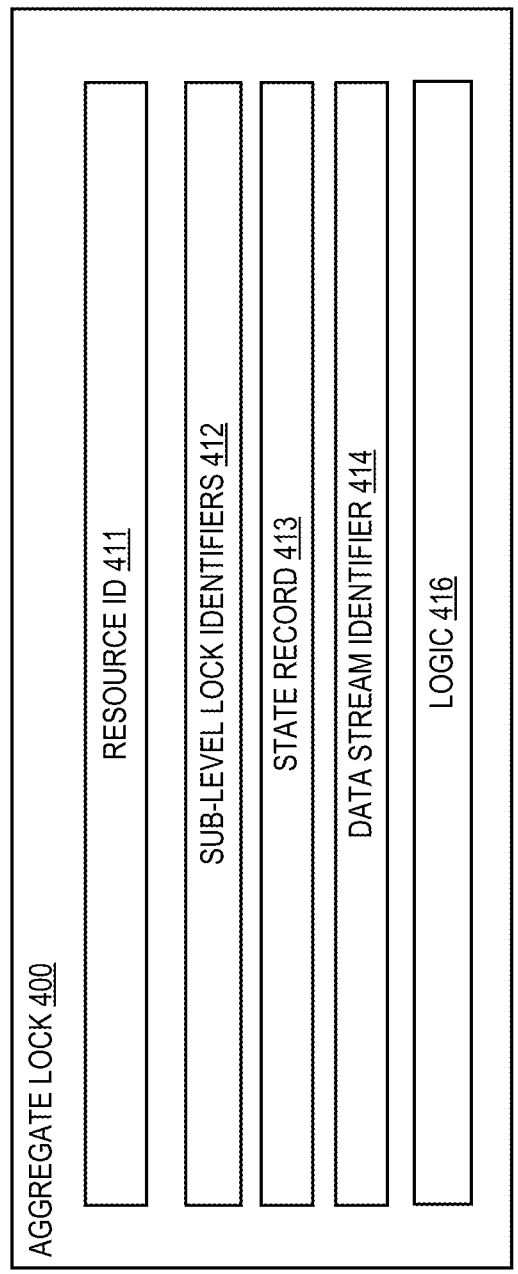
FIG. 4A is a diagram of an example of an aggregate lock, according to aspects of the disclosure.
Figure 4B:
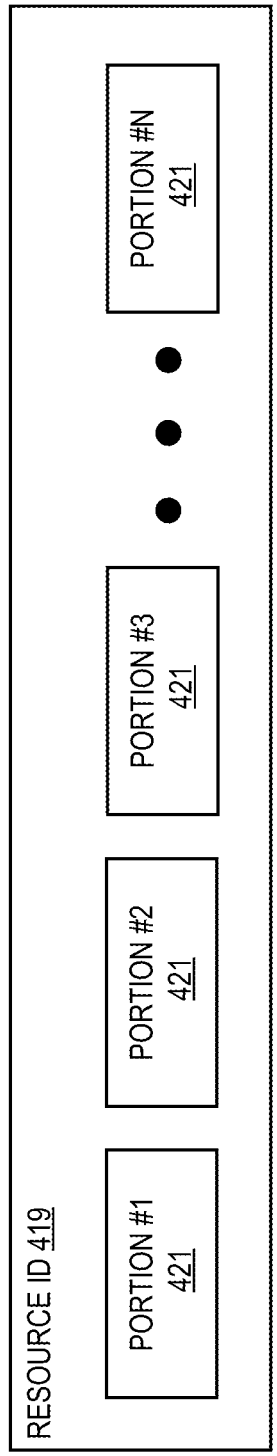
FIG. 4B is a diagram of an example of a resource, according to aspects of the disclosure.

FIG. 4A is a diagram of an example of an aggregate lock 400, according to aspects of the disclosure. The lock 400 may be the same or similar to any of locks 114, which are shown in FIG. 1. The lock 400 may be configured to synchronize read and/or write access to the resource 419, which is shown in FIG. 4B. The resource 419 may be the same or similar to any of resources 116, which are shown in FIG. 1. For example, the resource 419 may include a single file or a plurality of files. As another example, the resource 419 may include a single object or a plurality of objects. The resource 419 may be processed in parallel by the processes 112. For example, as illustrated in FIG. 4B, the resource 419 may be divided into a plurality of portions 421. Each of portions 421 may be assigned to a different one of processes 112 and processed in parallel with the rest. Each of the portions 421 may include a separate file, a separate portion of the file, a separate portion of an object, a separate portion of an object, and/or any other suitable type of data item. As is discussed further below, because the lock 400 is in effect aggregation of a plurality of sub-level locks, the lock 400 may be especially well-adapted to synchronize read and/or write access to resources that can be divided into parts and processed in parallel.

The lock 400 may include a resource ID 411, which corresponds to the resource 419. The lock 400 may further include a set of sub-level lock identifiers 412, state record 413, a data stream identifier 414, and logic 416. The set 412 may include a plurality of identifiers of sub-level locks that are spawned by the aggregate lock 400. Each of the identifiers in the set 412 may correspond to a different sub-level lock. The state record 413 may include any suitable type of data structure that is configured to identify the current state of all (or at least some) sublevel locks that have been spawned by the lock 400 and are currently active (or allocated in memory). Specifically, the state record 413 may indicate whether each (or at least some) of the sub-level locks is currently released, acquired, or delay-released. The data stream identifier 414 may identify a data stream that is used for communication between the sub-level locks and the aggregate lock 400. The logic 416 may include one or more processor-executable instructions for executing acquire and release instructions that are received by the lock 400 from any of the processes 112. Although in the example of FIG. 4 the logic 416 is implemented in software, alternative implementations are possible in which the logic 416 is implemented as a combination of software and hardware.

Figure 4C:
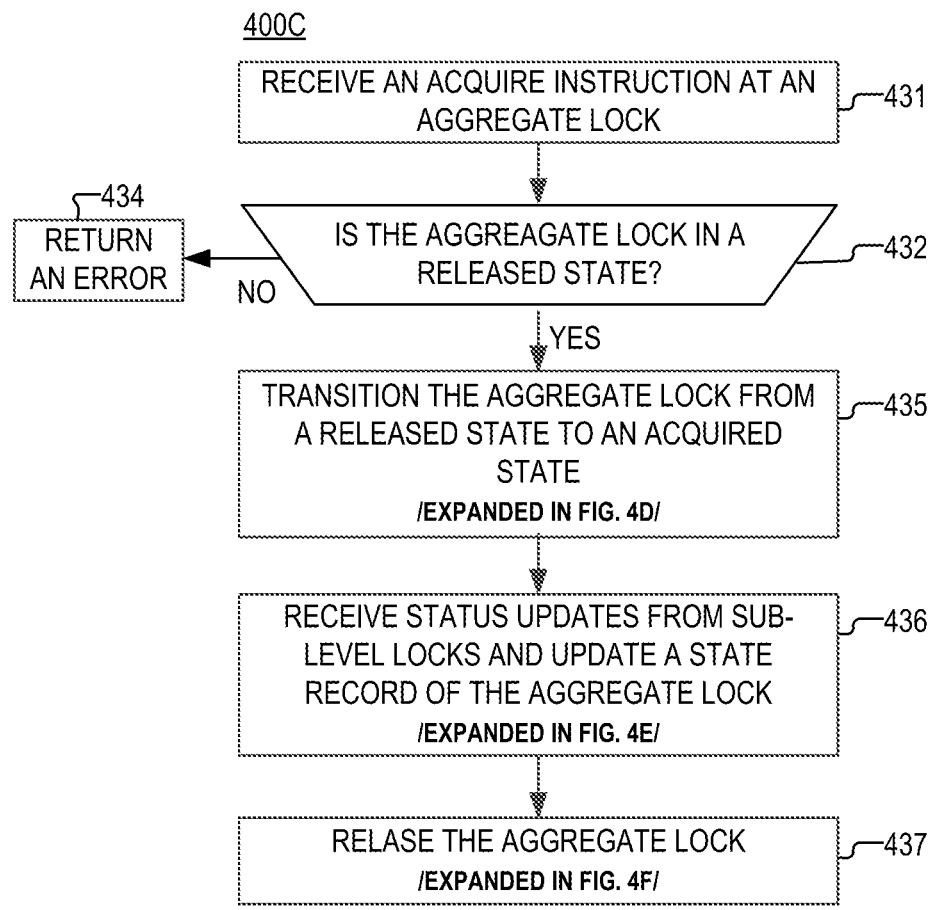
FIG. 4C is a flowchart of an example of a process, according to aspects of the disclosure.

FIG. 4C. is a flowchart of an example of a process 400C for acquiring the lock 400, according to aspects of the disclosure. At step 431, the logic 416 (or lock 400) receives an acquire instruction from a given one of the processes 112. At step 432, the logic 416 detects if the lock 400 is currently in a released state. If lock 400 is currently in a released state, the lock 400 transitions to step 435. If lock 400 is not in the released state (i.e., if the lock is in an acquired or delay-released state), the process 400C proceeds to step 434. At step 434, the logic 416 returns an error. At step 435, the logic 416 transitions the lock 400 from a released state to an acquired state. When transitioning into an acquired state, the lock 400 instantiates a plurality of sub-level locks which would be used to synchronize access to different portions 421 of the resource 419. In some implementations, step 435 may be performed in accordance with a process 400D, which is discussed further below with respect to FIG. 4D. At step 436, the logic 416 receives status updates from the sub-level locks that are instantiated by the lock 400. Any of the status updates may be transmitted by a respective sub-level lock when the sub-level lock is acquired or released, thus letting the lock 400 know that the current state of the sub-level lock has changed. In some implementations, step 436 may be performed in accordance with a process 400E, which is discussed further below with respect to FIG. 4E. At step 437, the lock 400 is released. In some implementations, step 436 may be performed in accordance with a process 400F, which is discussed further below with respect to FIG. 4F.

Figure 4D:
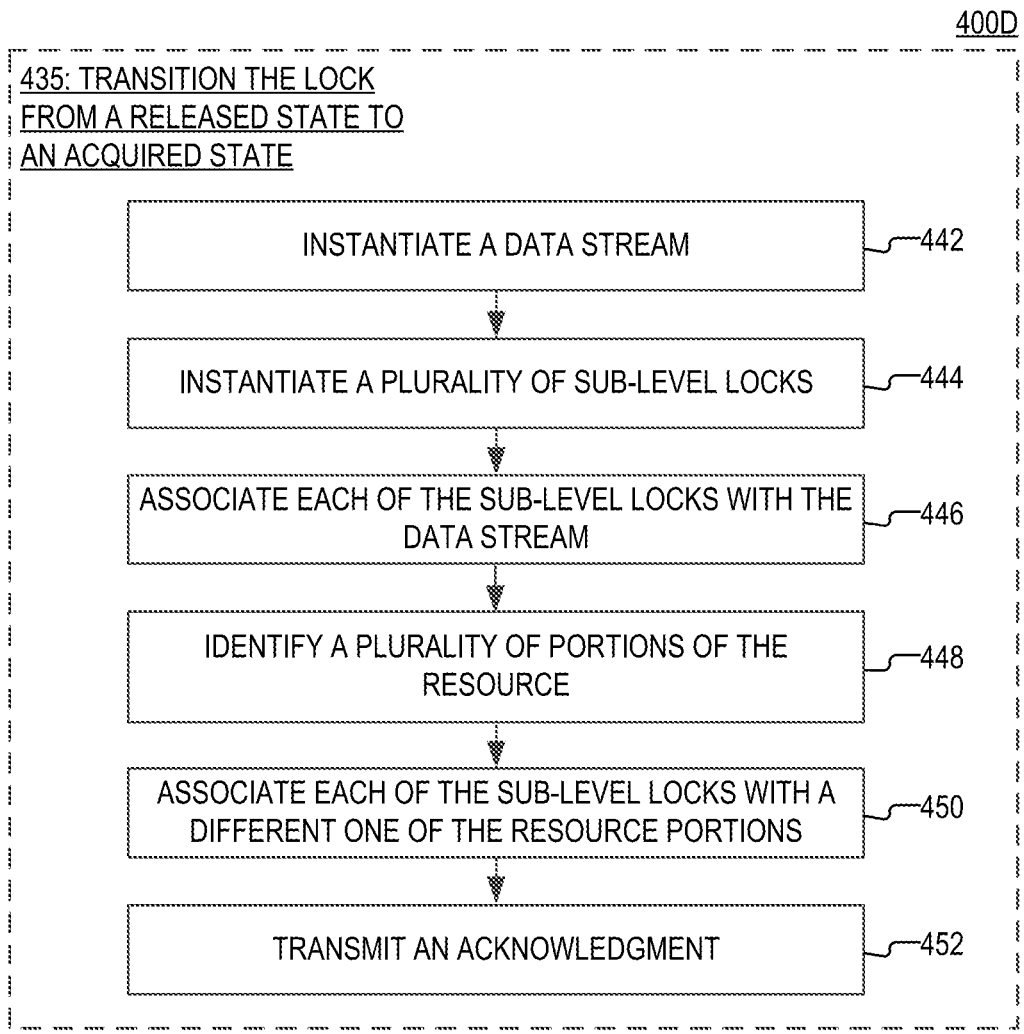
FIG. 4D is a diagram of an example of a resource, according to aspects of the disclosure.

FIG. 4D is a flowchart of an example of a process 400D for transitioning the lock 400 from an acquired state into a released state, according to aspects of the disclosure. At step 442, the logic 416 instantiates a data stream. At step 444, the logic 416 instantiates a plurality of sublevel locks. At step 446, the logic 416 associates each of the sub-level locks with the data stream (instantiated at step 442). At step 448, the logic 416 identifies a plurality of portions 421 of the resource 419 (shown in FIGS. 4A-B). At step 450, the logic 416 associates each of the sub-level locks with a different one of the resource portions. The association may include inserting an identifier in each of the sub-level locks that belongs to the sub-level lock's respective resource portion or taking any other action which would cause the lock to be used to synchronize access to the resource. At step 452, the logic 416 notifies the given process 112 from which the acquire request is received at step 431 that the lock has transitioned into an acquired and it is now in possession of the lock 400.

Figure 4E:
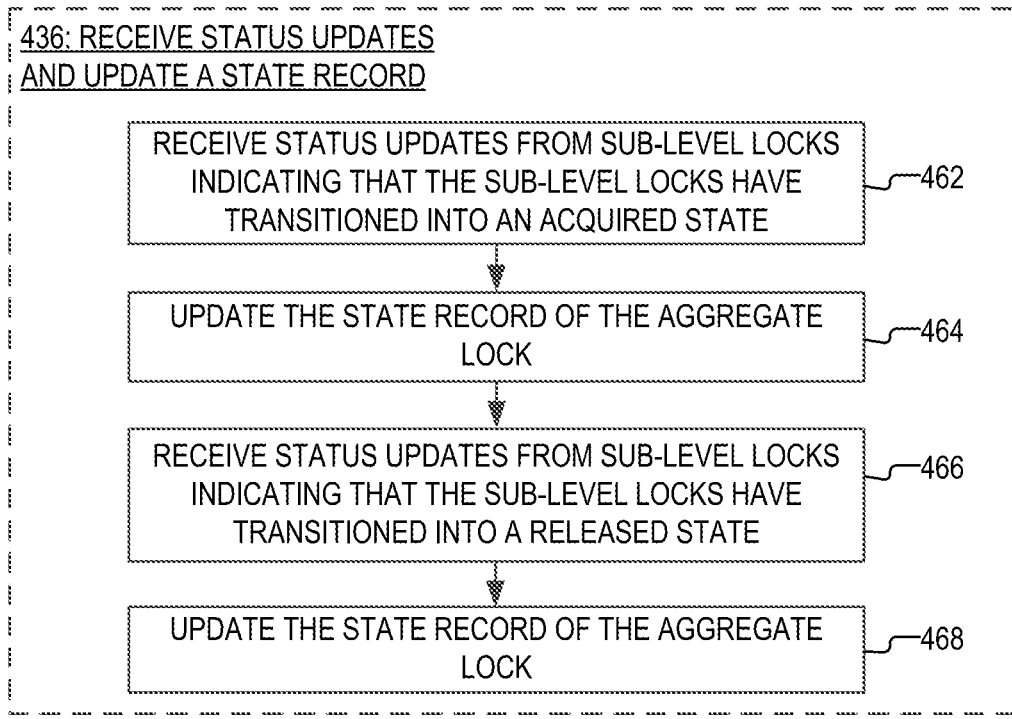
FIG. 4E is a diagram of an example of a resource, according to aspects of the disclosure.

FIG. 4E is a flowchart of an example of a process 400E for receiving status updates from sub-level locks and updating the state record 413, as specified by step 436 of the process 400C, according to aspects of the disclosure. At step 462, the logic 416 receives status updates from one or more of the sub-level locks that are instantiated at step 435, which indicate that the sub-level locks have been acquired. Each of the status updates may be received over the data stream (instantiated at step 442). As is discussed further below with respect to FIGS. 5A-B, each of the sub-level locks may include logic for executing release instructions and acquire instructions that are executed independently of (or autonomously from) the logic 416. Every time a sub-level lock is acquired or released, the logic of this sub-level lock may report the state change to the lock 400, and the lock 400 (or logic 416) may update the state record 413 accordingly. At step 464, the logic 416 updates the state record 413 based on the status updates received at step 462. Specifically, for any given sub-level lock from which a status update is received indicating that the given sub-level lock has been acquired, the logic 416 may update the state record 413 to indicate that the sub-level lock has been acquired. At step 466, the logic 416 receives status updates from one or more of the sub-level locks that are instantiated at step 435, which indicate that the sub-level locks have been released. Each of the status updates may be received over the data stream (instantiated at step 442). At step 468, the logic 416 updates the state record 413 based on the status updates received at step 466. Specifically, for any given sub-level lock from which a status update is received indicating that the given sub-level lock has been released, the logic 416 may update the state record 413 to indicate that the sub-level lock has been released.

Figures 4F, 4G:
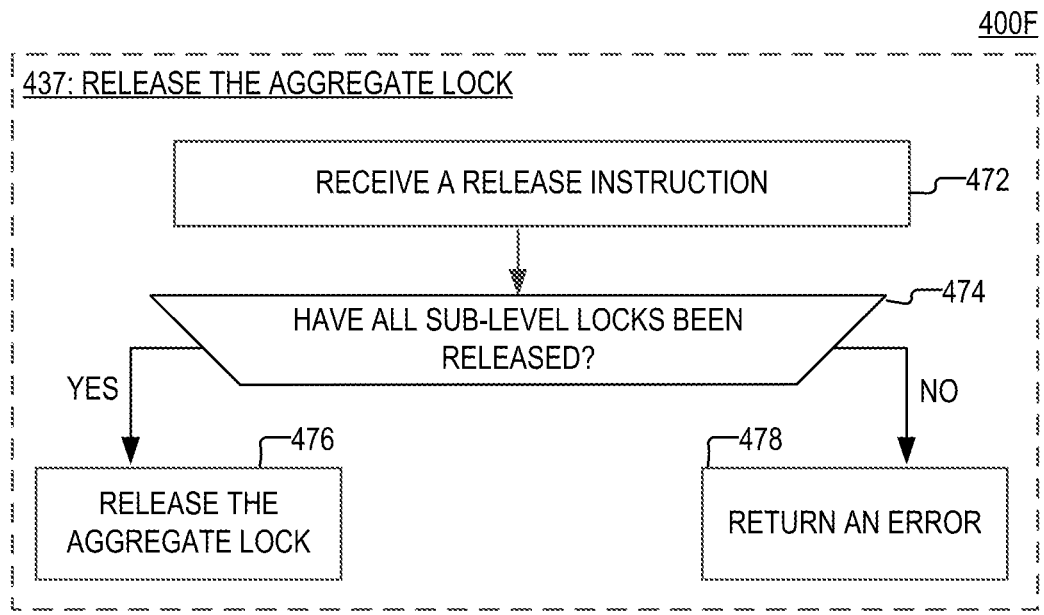
FIG. 4F is a diagram of an example of a resource, according to aspects of the disclosure.
FIG. 4G is a diagram of an example of a state record, according to aspects of the disclosure.

FIG. 4F is a flowchart of an example of a process 400F for releasing the lock 400, as specified by step 437 of the process 400C, according to aspects of the disclosure. At step 472, the logic 416 receives a release instruction from the given process 112, which is currently holding the lock 400. At step 474, the logic 416 performs a search of the sublevel-lock status identifiers to determine if all of the locks instantiated at step 444 are currently in a released state. If all of the sub-level locks are currently released, the process 400F proceeds to step 476. If not all of the sub-level locks are currently in a released state, the process 400F proceeds to step 478. At step 476, the logic 416 transitions the lock into a released state (or a delay-released state). At step 478, the logic 416 returns an error.

FIG. 4G is a diagram of an example of the state record 413. As illustrated, the state record 413 may include a plurality of entries 482. Each entry 482 may be associated with a different one of the sub-level locks (instantiated at step 435). Each entry 482 may include an identifier that indicates the current state of the entry's 482 respective sub-level lock. The identifier may include any number, string, or alphanumerical string. According to the present example, the state record 413 is a table. However, it will be understood that the present disclosure is not limited to any specific method for storing and/or encoding information recording the current state of the sub-level locks.

In the example of FIGS. 4A-G, a new set of sub-level locks is instantiated every time the lock 400 is acquired. However, alternative implementations are possible in which a pool of sub-level locks is instantiated when the lock 400 becomes active. In such implementations, the lock 400 may reserve locks from the pool every time the lock 400 is acquired, subsequently, when the lock is released, the lock 400 may return the sub-level locks back to the pool.

In the example of FIG. 4A, the lock 400 is implemented as a monolithic object that encapsulates the resource ID 411, the sub-level lock identifiers 412, the state record 413, the data stream identifier 414, and the logic 416. However, it will be understood that the present disclosure is not limited to any specific method for associating the lock 400 with these items. For example, in some implementations, at least one of the resource ID 411, the sub-level lock identifiers 412, the state record 413, the data stream identifier 414, and the logic 416 may be provided externally of the lock 400 and referenced by the lock 400.

In the example of FIGS. 4A-G, the lock 400 instantiates a data stream every time the lock 400 is acquired. However, alternative implementations are possible in which the data stream is instantiated once, for the entire lifetime of the lock 400, when the lock 400 initially becomes active. Although in the example of FIGS. 4A-G the lock 400 uses a data stream to receive status updates from sub-level locks, it will be understood that the present disclosure is not limited to any specific channel for receiving status updates from sub-level locks.

In the example of FIGS. 4A-G, the logic 416 identifies a plurality of portions of the resource 419. Identifying the plurality of portions may include one or more of generating a list of memory addresses that correspond to different portions of the resource 419, dividing the resource 419 into portions, examining the resource 419 to determine how many portions are present in it that could be processed in parallel, retrieving a list of the portions, and/or taking any other action that would result in the logic 416 obtaining a set of identifiers that correspond to the different portions.

Although not shown in FIGS. 4A-G, it will be understood that in some implementations, the lock 400 may also include a delay-release timer, such as the timer 220, which is discussed above with respect to FIG. 2A. In such implementations, the logic 416 may use this timer in the manner discussed with respect to FIG. 2A.

Figure 5A:
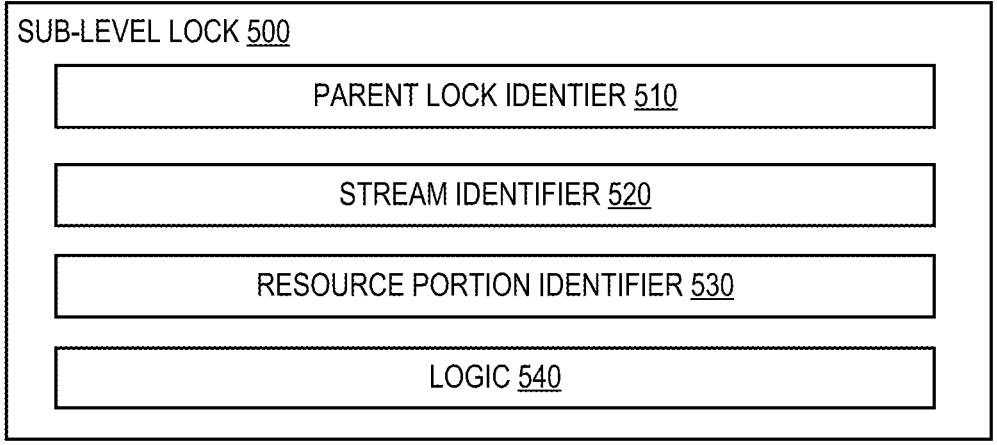
FIG. 5A is a diagram of an example of a sub-level lock, according to aspects of the disclosure.

FIG. 5A is a diagram of an example of a sub-level lock 500. The sub-level lock 500 may be the same or similar to any of the sub-level locks instantiated at step 435 of the process 400C. The sub-level lock 500 may be configured to synchronize write and/or read access of one of portions 421 (hereinafter "associated resource portion") of the resource 419.

The sub-level lock 500 may include a parent lock identifier 510, a stream identifier 520, a resource portion identifier 530, and a logic 540. The parent lock identifier 510 may include any identifier belonging to an aggregate lock, which has instantiated (or otherwise spawned) the sub-level lock 500. In the present example, the parent lock identifier 510 identifies the lock 400. The stream identifier 520 identifies a data stream that can be used by the sub-level lock 500 for reporting status updates to its parent lock (e.g., the lock 400). As noted above, the status updates may include notifications that the sub-level lock 500 has been acquired or released. The resource portion identifier 530 identifies the resource portion 421 that is associated with the sub-level lock 500. The logic 540 may include one or more processor-executable instructions for executing acquire and release instructions that are received by the sub-level lock 500 from any of the processes 112. Although in the example of FIG. 5A the logic 540 is implemented in software, alternative implementations are possible in which the logic 540 is implemented in hardware or as a combination of software and hardware.

Figure 5B:
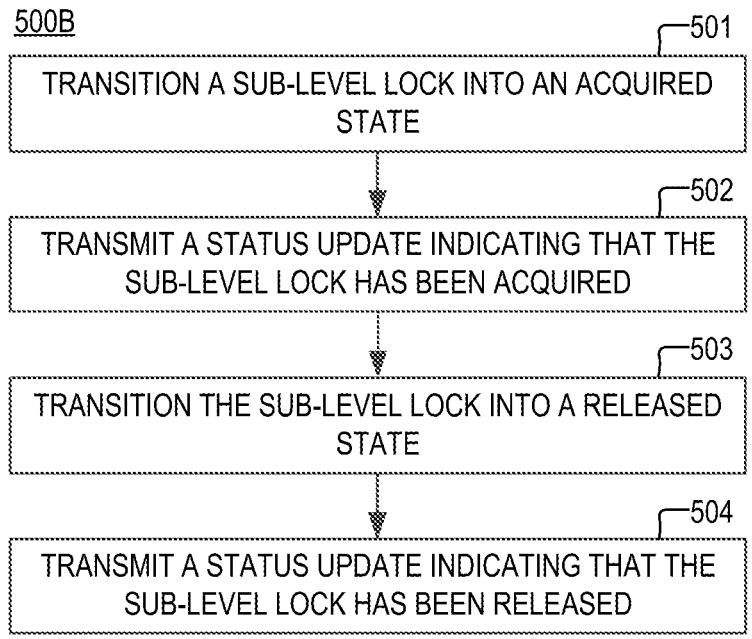
FIG. 5B is a diagram of an example of a sub-level lock, according to aspects of the disclosure.

FIG. 5B is a flowchart of an example of a process 500B for operating the sub-level lock 500, according to aspects of the disclosure. At step 501, the logic 540 transitions the sub-level lock 500 into an acquired state. The lock may be transitioned in response to the receipt of an acquire instruction, as discussed above with respect to FIG. 2B. At step 502, the logic 540 transmits a status update indicating that the sub-level lock 500 has transitioned into the acquired state. The status update may be transmitted to the parent of the sub-level lock 500, which in the present example is the lock 400. The status update may be transmitted by writing the status update to the data stream (instantiated at step 442). In some implementations, the status update may include any number, string, or alphanumerical string that identifies the current state of the sub-level lock (e.g., "acquired"). At step 503, the logic 540 transitions the sub-level lock 500 into a released state. The lock may be transitioned in response to the receipt of a release instruction, in response to a watchdog timer expiring or in response to a delayed-release timer expiring, as discussed above with respect to FIG. 2B. At step 504, the logic 540 transmits a status update indicating that the sub-level lock 500 has transitioned into the acquired state. The status update may be transmitted to the parent of the sub-level lock 500, which in the present example is the lock 400. The status update may be transmitted by writing the status update to the data stream (instantiated at step 442). In some implementations, the status update may include any number, string, or alphanumerical string that identifies the current of the sub-level lock (e.g., "released").

Although in the example of FIG. 5B status updates are transmitted to the parent aggregate lock (e.g., the lock 400) when the sub-level lock 500 is acquired and released, in some implementations a similar status update may be transmitted to the sub-level lock enters a delay-released state and/or any other state.

Although not shown in FIG. 5A, it will be understood that in some implementations, the sub-level lock 500 may also include a watchdog timer and a delay-release timer, such as the timers 210 and 220, which are discussed above with respect to FIG. 2A. In such implementations, the logic 540 may use those timers in the manner discussed with respect to logic 230 and FIG. 2A.

In the example of FIG. 5A, the sub-level lock 500 is implemented as a monolithic object that encapsulates the parent lock identifiers 510, the stream identifier 520, the resource portion identifier 530, and the logic 540. However, it will be understood that the present disclosure is not limited to any specific method for associating the lock 400 with these items. For example, in some implementations, at least one of the parent lock identifiers 510, the stream identifier 520, the resource portion identifier 530, and the logic 540 may be provided externally of the sub-level lock 500 and referenced by the sub-level lock 500.

Figure 6:
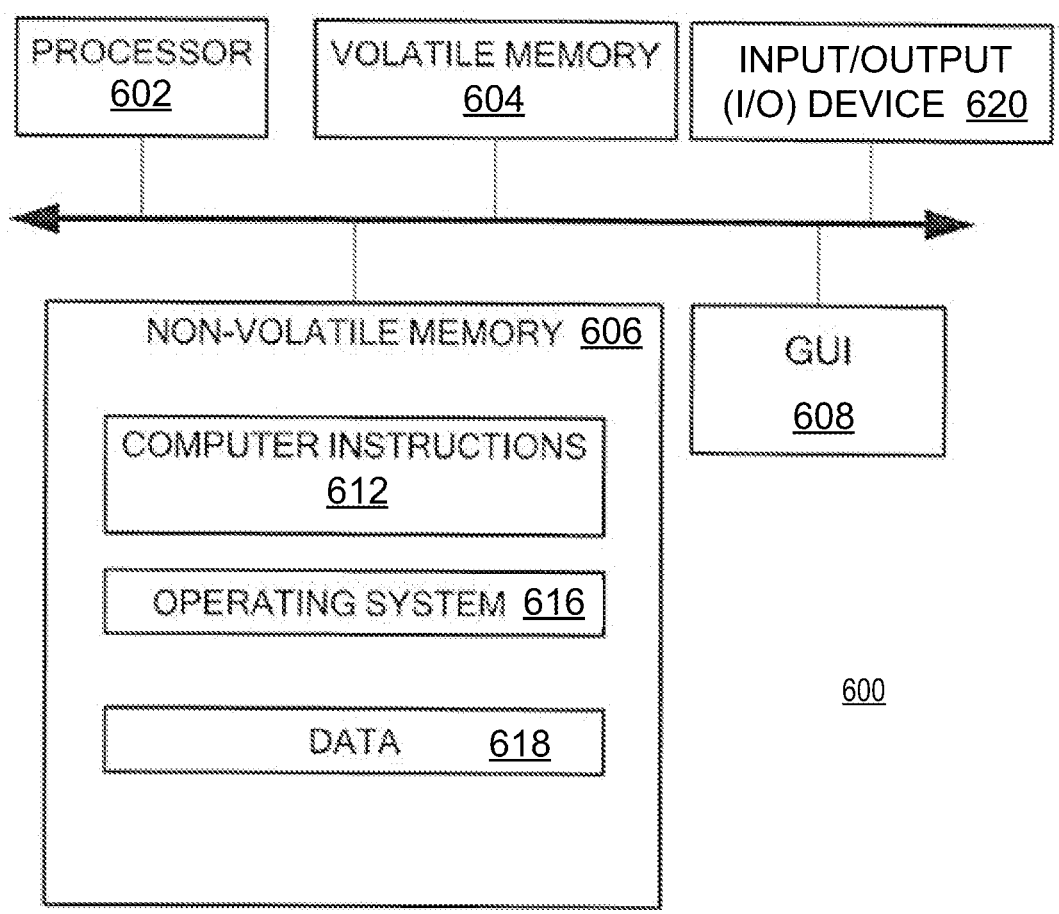
FIG. 6 is a diagram of an example of a computing device, according to aspects of the disclosure.

Referring to FIG. 6, computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-6 are provided as an example only. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
receiving, by at least one processor, a first request to acquire a lock that is associated with a resource, the lock being an object that includes integrated logic for acquiring and releasing the lock;
transitioning the lock into an acquired state in response to the first request;
receiving, by the at least one processor, a second request to release the lock; and
releasing the lock in response to the second request to release the lock, the lock being released by executing the integrated logic for acquiring and releasing the lock, wherein executing the integrated logic causes the at least one processor to: (i) detect whether a timer is set (ii) when the timer is set; transition the lock from the acquired state into a delay released state by activating a timer, wait until the timer has expired, and transition the lock from the delay released state into a released state after the timer has expired, and (iii) when the timer is not set, transition the lock directly into the released state from the acquired state.

2. The method of claim 1, wherein transitioning the lock into the acquired state includes identifying a plurality of sub-level locks and associating each of the sub-level locks with a different portion of the resource.

3. The method of claim 1, wherein transitioning the lock into the acquired state includes:
identifying a plurality of portions of the resource;
identifying a plurality of sub-level locks; and
associating each of the plurality of portions of the resource with a respective one of the plurality of sub-level locks.

4. The method of claim 1, wherein transitioning the lock into the acquired state includes:
identifying a plurality of portions of the resource; and
associating each of the plurality of portions of the resource with a respective one of a plurality of sub-level locks, each of the sub-level locks being configured to report the sub-level lock's current state to the lock via a data stream that is associated with the lock.

5. The method of claim 1, wherein:
transitioning the lock into the acquired state includes identifying a plurality of sub-level locks and associating each of the sub-level locks with a different portion of the resource, and
each of the sub-level locks is configured to notify the lock when the sub-level lock is acquired and released.

6. The method of claim 1, wherein:
transitioning the lock into the acquired state includes associating each of a plurality of sub-level locks with a different portion of the resource, and
releasing the lock includes detecting a respective current state of each of the sub-level locks, such that the lock is released only when all of the plurality of sub-level locks are currently in a released state.

7. The method of claim 1, wherein logic is further configured to communicate with sub-level locks that are associated with the lock.

8. The method of claim 1, wherein:
the first request includes a version parameter;
transitioning the lock into an acquired state includes detecting whether the version parameter matches a resource version ID that is associated with the resource, the resource version ID being an identifier that is incremented when the resource is modified, and
the lock is transitioned into the acquired state only when the version parameter matches the resource version ID.

9. A system, comprising:
at least one processor that is configured to perform the operations of:
receiving a first request to acquire a lock that is associated with a resource, the lock being an object that includes integrated logic for acquiring and releasing the lock;
transitioning the lock into an acquired state in response to the first request;
receiving a second request to release the lock; and
releasing the lock in response to the second request to release the lock, the lock being released by executing the integrated logic for acquiring and releasing the lock, wherein executing the integrated logic causes the at least one processor to (i) detect whether a timer is set, (ii) when the timer is set: transition the lock from the acquired state into a delay released state by activating a timer, wait until the timer has expired, and transition the lock from the delay released state into a released state after the timer has expired, and (iii) when the timer is not set, transition the lock directly into the released state from the acquired state.

10. The system of claim 9, wherein transitioning the lock into the acquired state includes identifying a plurality of sub-level locks and associating each of the sub-level locks with a different portion of the resource.

11. The system of claim 9, wherein transitioning the lock into the acquired state includes:
identifying a plurality of portions of the resource;
identifying a plurality of sub-level locks; and
associating each of the plurality of portions of the resource with a respective one of the plurality of sub-level locks.

12. The system of claim 9, wherein transitioning the lock into the acquired state includes:
identifying a plurality of portions of the resource; and
associating each of the plurality of portions of the resource with a respective one of a plurality of sub-level locks, each of the sub-level locks being configured to report the sub-level lock's current state to the lock via a data stream that is associated with the lock.

13. The system of claim 9, wherein:
transitioning the lock into the acquired state includes identifying a plurality of sub-level locks and associating each of the sub-level locks with a different portion of the resource, and
each of the sub-level locks is configured to notify the lock when the sub-level lock is acquired and released.

14. The system of claim 9, wherein:
transitioning the lock into the acquired state includes associating each of a plurality of sub-level locks with a different portion of the resource, and
releasing the lock includes detecting a respective current state of each of the sub-level locks, such that the lock is released only when all of the plurality of sub-level locks are currently in a released state.

15. The system of claim 9, wherein:
the first request includes a version parameter;
transitioning the lock into an acquired state includes detecting whether the version parameter matches a resource version ID that is associated with the resource, the resource version ID being an identifier that is incremented when the resource is modified, and
the lock is transitioned into the acquired state only when the version parameter matches the resource version ID.

16. A non-transitory computer-readable medium storing one or more processor-executable instructions, which when executed by at least one processor cause the at least one processor to perform the operations of:
receiving a first request to acquire a lock that is associated with a resource, the lock being an object that includes integrated logic for acquiring and releasing the lock;
transitioning the lock into an acquired state in response to the first request;
receiving, by the at least one processor, a second request to release the lock; and
releasing the lock in response to the second request to release the lock, the lock being released by executing the integrated logic for acquiring and releasing the lock, wherein executing the integrated logic causes the at least one processor to: (i) detect whether a timer is set, (ii) when the timer is set; transition the lock from the acquired state into a delay released state by activating a timer, wait until the timer has expired, and transition the lock from the delay released state into a released state after the timer has expired, and (iii) when the timer is not set, transition the lock directly into the released state from the acquired state.

17. The non-transitory computer-readable medium of claim 16, wherein transitioning the lock into the acquired state includes:
identifying a plurality of portions of the resource;
identifying a plurality of sub-level locks; and
associating each of the plurality of portions of the resource with a respective one of the plurality of sub-level locks.

\* \* \* \* \*